(12) United States Patent
Flint

(10) Patent No.: US 12,190,240 B2
(45) Date of Patent: Jan. 7, 2025

(54) METHOD AND SYSTEM FOR SECURELY STORING AND PROGRAMMATICALLY SEARCHING DATA

(71) Applicant: Alexander Calhoun Flint, Birchgrove (AU)

(72) Inventor: Alexander Calhoun Flint, Birchgrove (AU)

( * ) Notice: Subject to any disclaimer, the term of this patent is extended or adjusted under 35 U.S.C. 154(b) by 268 days.

(21) Appl. No.: 17/652,920

(22) Filed: Feb. 28, 2022

(65) Prior Publication Data

US 2022/0277098 A1   Sep. 1, 2022

Related U.S. Application Data

(60) Provisional application No. 63/155,210, filed on Mar. 1, 2021.

(51) Int. Cl.
G06F 21/62 (2013.01)
G06F 21/60 (2013.01)
G06N 3/08 (2023.01)

(52) U.S. Cl.
CPC .............. *G06N 3/08* (2013.01); *G06F 21/602* (2013.01); *G06F 21/6227* (2013.01)

(58) Field of Classification Search
CPC ...... G06N 3/08; G06F 21/602; G06F 21/6227
See application file for complete search history.

(56) References Cited

U.S. PATENT DOCUMENTS

| | | | | |
|---|---|---|---|---|
| 6,125,378 A * | 9/2000 | Barbano | ............... | G06F 7/582 708/254 |
| 6,826,181 B1 * | 11/2004 | Higashida | ........ | H03M 13/2707 375/E7.025 |
| 10,713,589 B1 * | 7/2020 | Zarandioon | ........... | G06N 20/00 |
| 10,909,604 B1 * | 2/2021 | Zappella | ............... | G06N 20/00 |
| 10,929,896 B1 * | 2/2021 | Nath | ..................... | G06F 16/951 |
| 10,963,926 B1 * | 3/2021 | Nath | ................. | G06Q 30/0276 |
| 2002/0147954 A1 * | 10/2002 | Shea | ..................... | H03M 13/11 714/755 |
| 2003/0018608 A1 * | 1/2003 | Rice | ....................... | G06F 21/14 |
| 2005/0210260 A1 * | 9/2005 | Venkatesan | .......... | H04L 9/0643 713/180 |
| 2011/0194687 A1 * | 8/2011 | Brothers | ............... | H04L 9/0668 380/28 |
| 2014/0025905 A1 * | 1/2014 | Brown | .................. | G06F 3/0683 711/E12.001 |
| 2014/0149480 A1 * | 5/2014 | Catanzaro | .............. | G06F 7/766 708/520 |

(Continued)

OTHER PUBLICATIONS

NPL Search History (Year: 2024).*

(Continued)

*Primary Examiner* — Samson B Lemma
*Assistant Examiner* — Richard W Cruz-Franqui
(74) *Attorney, Agent, or Firm* — Steven R. Vosen

(57) ABSTRACT

Systems and methods are disclosed for securely storing and programmatic searching of data files. The invention includes storing datafiles in fixed-sized packets of data that are subjected to fixed shuffle of the data elements (with or without prior fixed padding and with or without prior fixed perturbation), and target search elements are identified by way of the fixed shuffled indices, which are encrypted by conventional methods and decrypted for search by credentialed users.

13 Claims, 4 Drawing Sheets

(56) References Cited

U.S. PATENT DOCUMENTS

| | | | | |
|---|---|---|---|---|
| 2014/0201450 | A1* | 7/2014 | Haugen | G06F 7/60 712/3 |
| 2015/0039851 | A1* | 2/2015 | Uliel | G06F 9/30038 712/4 |
| 2015/0089574 | A1* | 3/2015 | Mattsson | G06F 21/6245 726/1 |
| 2015/0186627 | A1* | 7/2015 | Teuwen | G06F 21/14 713/190 |
| 2016/0134601 | A1* | 5/2016 | Finlow-Bates | G09C 1/00 713/165 |
| 2016/0328540 | A1* | 11/2016 | Hoogerbrugge | G06F 21/602 |
| 2017/0053135 | A1* | 2/2017 | Mattsson | G06F 21/602 |
| 2017/0353302 | A1* | 12/2017 | Fernandez | H04L 9/14 |
| 2019/0087689 | A1* | 3/2019 | Chen | H04L 9/0825 |
| 2019/0294956 | A1* | 9/2019 | Cheung | G06F 21/6245 |
| 2019/0318085 | A1* | 10/2019 | Mathur | G06F 21/55 |
| 2019/0319641 | A1* | 10/2019 | Hwang | H04L 1/0041 |
| 2019/0325108 | A1* | 10/2019 | Turek | G06N 3/08 |
| 2019/0340381 | A1* | 11/2019 | Yavuz | G06F 21/606 |
| 2019/0363880 | A1* | 11/2019 | Lee | H04L 9/0825 |
| 2019/0386819 | A1* | 12/2019 | Ertl | G06F 11/3082 |
| 2020/0044852 | A1* | 2/2020 | Streit | G06N 3/08 |
| 2020/0110992 | A1* | 4/2020 | Hosseinzadeh | G06N 3/04 |
| 2020/0272340 | A1* | 8/2020 | Kwok | G06F 3/0616 |
| 2020/0401645 | A1* | 12/2020 | Brown | H04W 4/14 |
| 2021/0089877 | A1* | 3/2021 | Shechtman | G06N 3/08 |
| 2021/0149980 | A1* | 5/2021 | Pavlini | G06F 16/9538 |
| 2021/0201126 | A1* | 7/2021 | Meng | G02F 3/00 |
| 2021/0288976 | A1* | 9/2021 | Huang | G06N 3/045 |
| 2021/0319090 | A1* | 10/2021 | Demir | G06N 3/045 |
| 2021/0342541 | A1* | 11/2021 | Taylor | G06F 16/3328 |
| 2021/0374229 | A1* | 12/2021 | Kumar | G06F 21/563 |
| 2022/0190956 | A1* | 6/2022 | Chen | H04L 1/0045 |
| 2022/0197971 | A1* | 6/2022 | Sikka | G06F 17/16 |
| 2022/0229810 | A1* | 7/2022 | Yoon | G06F 16/313 |
| 2022/0286272 | A1* | 9/2022 | Wang | G06F 21/602 |
| 2023/0403143 | A1* | 12/2023 | Tsuchida | G09C 1/00 |

OTHER PUBLICATIONS

International Search Report and Written Opinion of the International Searching Authority for PCT/US 22/70872; Jul. 1, 2022.

* cited by examiner

METHOD AND SYSTEM FOR SECURELY STORING AND PROGRAMMATICALLY SEARCHING DATA

CROSS-REFERENCE TO RELATED APPLICATIONS

This application claims the benefit of U.S. Provisional Application No. 63/155,210, filed Mar. 1, 2021, the contents of which is hereby incorporated by reference in its entirety.

BACKGROUND OF THE INVENTION

Field of the Invention

The present invention generally relates to data security and more specifically to a method and system for performing programmatic search on securely stored data.

Discussion of the Background

Methods for programmatic search, namely identification of the presence and location of specific elements within a corpus of information stored in any manner of computer memory, have been extensively developed and refined. One notable limitation of programmatic search is encountered when the corpus of information to be searched is encrypted by conventional methods. In conventional methods for encryption, raw data is converted by means of one or more cryptographic keys and an algorithm that creates an encrypted version of raw data that is typically not the same size as the raw data in memory. If a user or system intends to perform programmatic search on a corpus of encrypted information, the entire corpus must be decrypted to the raw (unencrypted) form of the corpus, prior to algorithmic search. For a large corpus of information in computer memory or distributed solutions, such as web- or cloud-based computing, the process of decryption for search is time- and resource-intensive. For a corpus of information on a computer system, cloud system, electronic communication system, or social media system that is encrypted for privacy purposes, it is not possible to perform functions such as matching advertisements to content because the content is encrypted by conventional methods that prevent the necessary search functions required to make such a match. One solution in common use that allows for algorithmic search of data stored in cloud systems is to store data at rest in unencrypted form, with password-protection applied to user access to the cloud system. This approach suffers from the known security vulnerabilities inherent to any system with data stored in unencrypted form.

There is thus a need in the art for a method and system that provides that provides for efficiently and securely searching of secured information.

BRIEF SUMMARY OF THE INVENTION

In one aspect of the invention, a method of securely storing information is provided, where the method includes accepting information; forming the information into a plurality of packets of uniform size; determining an algorithm to modify packets of uniform size; modifying information by applying the algorithm to each of the packets of the plurality of packets; and storing the modified information. In various embodiments the method: 1) is for searching modified information, and includes accepting a search parameter; using the algorithm as a lookup table to determine the presence and location of the search parameter in the accepted information, and providing the presence and location of the search parameter in the accepted information; 2) encompasses encrypting and decrypting the algorithm; 3) is for searching for files and the method includes accepting a request for a data file, using the algorithm as a lookup table to recover the requested data file from the stored modified one or more data files, and providing the requested one or more data files; and 4) determines an algorithm that includes one or more of a) a first pad of values which are appended to the examples, b) a plurality of perturbation functions applied to each example; and c) an index shuffling applied to each example.

In another aspect of the invention, a system is provided for securely storing information, said system including networked memory and processors programmed to: accept information; form the information into a plurality of packets of uniform size; determine an algorithm to modify packets of uniform size; modify information by applying the algorithm to each of the packets of the plurality of packets; and store the modified information. In various embodiments the processors are further programmed to: 1) search for modified information, including: accept a search parameter; using the algorithm as a lookup table to determine the presence and location of the search parameter in the accepted information, and provide the presence and location of the search parameter in the accepted information; 2) encrypt and decrypt the algorithm; 3) accept a request for a data file, using the algorithm as a lookup table to recover the requested data file from the stored modified one or more data files, and providing the requested one or more data files; and 4) where the algorithm includes one or more of a) a first pad of values which are appended to the examples, b) a plurality of perturbation functions applied to each example; and c) an index shuffling applied to each example.

These features together with the various ancillary provisions and features which will become apparent to those skilled in the art from the following detailed description, are attained by the method and system of the present invention, preferred embodiments thereof being shown with reference to the accompanying drawings, by way of example only, wherein:

BRIEF DESCRIPTION OF THE SEVERAL VIEWS OF THE DRAWING

FIG. 4 illustrates a system wherein files, messages, posts, notes, or other electronic communications on a mobile, online, Web-based, or cloud-based electronic communication system or computer system or cloud service may be stored securely in a format that allows for keyword matching search and secure neural network training by permissioned entities Reference symbols are used in the figures to indicate certain components, aspects or features shown therein, with

DETAILED DESCRIPTION OF THE INVENTION

The following discussion illustrates various techniques for securely storing data files, performing programmatic search of the data files, and for retrieving securely stored data files. Various aspects of this invention are also described in co-pending U.S. patent application Ser. No. 17/652,743, filed on Feb. 28, 2022, the contents of which are incorporated herein in its entirety.

Figure 1:
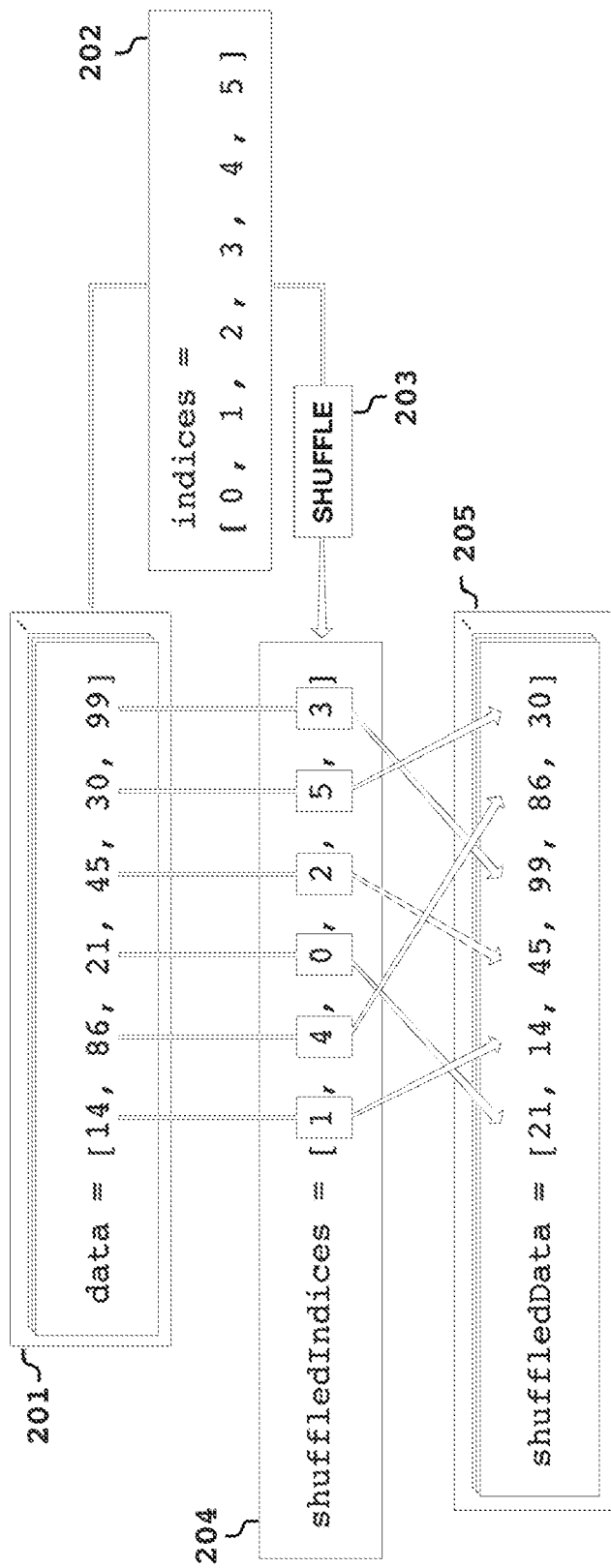
FIG. 1 illustrates the method of fixed shuffle processing of an input data file.

Securely storing data files may, for example, be accomplished by index shuffling, which rearranges the data in a manner that difficult to deduce from the rearranged data, but which can be efficiently reversed to retrieve or search the secured data file. Thus, for example, FIG. 1 illustrates the method of fixed shuffle processing of an input data file. FIG. 1 shows, for illustrative purposes, displaying a small data file (201) consisting of a 1-D array of 6 values for each example in the data file (a rank 2 tensor consisting of a 6-dimensional vector by any number (n) examples). Taking the first example of the data file (201) shown at the top of the stack, the indices of these 6 values are shown in (202), beginning, per usual convention in the art, with index 0. These indices are stored in an array (202) of the same size of the array shown in (201), and this array of indices is then subjected to a random shuffling algorithm (203) once, resulting in a shuffled index array (204) in which the index values are now found in a new position. The shuffled index array (204) is stored in memory and used to apply a fixed shuffle to each element of the full data file (201), resulting in a fixed shuffled data file (205). The fixed shuffle is applied by moving each value in each element of the data file (201) to the new index position in (205) based on the index value found in the fixed shuffle index array (204). By inspection of FIG. 1, each value in the original array in (201) can be traced to its new position in (205) by way of the index value found in (204). For example, the value '86' in (201) is found at index=1 in (201), so the shuffled index value of '4' is obtained from the position of index=1 in (204), indicating that the value '86' should be placed in position index=4 in the shuffled data file (205). As described above, the process of generating the shuffled index array (204) by shuffling (203) of the appropriately-shaped index array (202) is performed once for an entire data file, and the identical shuffling process as illustrated in (201, 204, 205) is applied to each element of the data file, yielding a fixed shuffle. The shuffled index array (204) therefore represents a lookup table that can be encrypted by conventional methods, along with the corresponding lookup tables for fixed padding and fixed perturbation as described above. It will be apparent to those skilled in the art that the process of fixed shuffling can be applied to any data file of tensors of any rank, either by the direct shuffling of arrays of the appropriate number of dimensions (e.g., the 1-D array shown in FIG. 2 or arrays of any number of dimensions), or by first flattening a higher dimensional array to a 1-D array with the application of the 1-D array shuffling method as shown in FIG. 1, followed by reshaping back to the original number of array dimensions.

Figure 2:
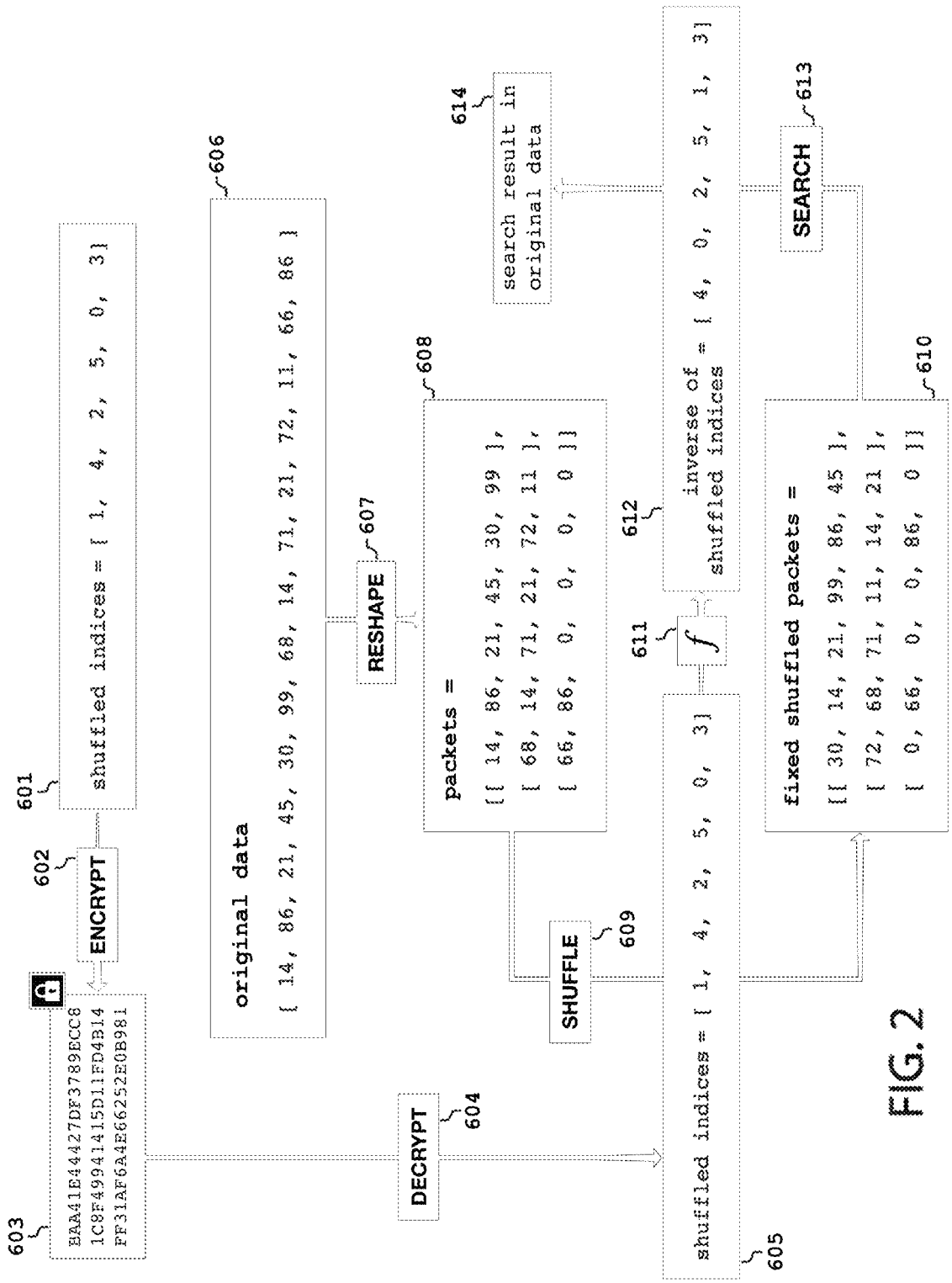
FIG. 2 illustrates methods to prepare data for storage and transmission in fixed shuffled packets for use with programmatic search.

FIG. 2 illustrates methods to prepare data for storage and transmission in fixed shuffled packets for use with programmatic search. For illustrative purposes, an original one-dimensional data array (606) containing 14 integer values is shown. It will be apparent to those skilled in the art that the data array may have any number of dimensions, with any number of values per dimension, and may store data in integer form, floating point value form, or in the form of another data type. For use with fixed shuffling and programmatic search, the original data array (606) is reshaped (607) into packets (608) of smaller size than the original data array. It will be apparent to those skilled in the art that the packet size may be any size that is smaller than the original data (606) size. For purpose of illustration, a packet size of 6 values is shown (608), converting the one-dimensional 14-value original dataset (606) into a two-dimensional packetized dataset (608) of 3 packets of 6 values each, where, for illustrative purposes, zero or Null values are appended to the final packet to bring the length of the final packet to 6 values. To perform fixed shuffling on the packetized dataset (608), a shuffled indices array (601) of length corresponding to the packet size is subjected to encryption by standard methods (602) with one or more encryption keys to yield an encrypted shuffled indices array (603) that may be stored or transmitted. The encrypted shuffled indices array (603) is decrypted (604) with one or more keys to yield the unencrypted shuffled indices array (605). The packetized data array (608) is subjected to a fixed shuffle (609) using the shuffled indices array (605), yielding a fixed shuffled packetized data array (610). In the illustrative example, each row of the packetized data array (608) is subjected to the same shuffle according to the shuffled indices array (605), so that a given column of values in the original packetized data array (608) is moved together to a new column position in the fixed shuffled packetized data array (610). To perform programmatic search, the inverse of the shuffled indices (612) is generated by a function (611) that swaps the index values and index positions in the shuffled indices array (605). The inverse of the shuffling index array (612) thus functions as a 'lookup table' to locate components of a search in the original data. Thus, for example, the method includes, for each element of a search, locating the element in the padded/shuffled data, then using the inverse of the padding and shuffling index array to determine the location of the element's match in the original data. See, for example, FIG. 4 in co-pending U.S. patent application Ser. No. 17/652,743.

Programmatic search (613) is then performed by means of the inverse of shuffled indices array (612) to yield a search result (614) in the original data. For example, using the values shown in the illustration, a search for sequence '14, 86, 21' in the fixed shuffled packetized data (610) could first determine the locations of the initial value '14' in the fixed shuffled packetized data (610), then convert the locations of these values in the original packetized data (608) using the inverse of shuffled indices lookup table (612), then look ahead for adjacent values '86' and '21' by the same lookup process. By this process, the location of the search sequence '14, 86, 21' in the fixed shuffled packetized data (610) will be determined to start at the 0th (initial) position of the 0th (initial) packet (row) of the original packetized data (608), corresponding to the 0th (initial) position in the original data (606). The process of looking ahead for adjacent values in this example takes into account the relationship of the end of one packet (row) in the unshuffled packetized data (608) with the beginning of the next packet (row) in the unshuffled packetized data (608), determined using the lookup via the inverse of the shuffled indices array (612), so search sequences crossing packet boundaries (for example, '99, 68, 14') are identified and the location of the search sequence is be determined in the original data (606).

In various embodiments, the shuffled indices (601) subjected to encryption by standard methods (602) are accompanied prior to encryption by a collection of corresponding data elements representing a fixed padding element and a fixed perturbation array. In various embodiments, a fixed padding element is stored for the original data shape prior to fixed shuffling by the shuffled indices (601) along with data stored to indicate the position of the fixed padding element relative to the original data. In various embodiments, a fixed perturbation array is stored for the data shape prior to fixed shuffling by the shuffled indices (601).

In various embodiments, data are prepared for programmatic search using packetization and fixed shuffling alone; in other embodiments, data are prepared for programmatic search using packetization, fixed padding, and fixed shuffling; in other embodiments, data are prepared for programmatic search using packetization, fixed perturbation, and fixed shuffling; and in other embodiments, data are prepared for programmatic search using packetization, fixed padding, fixed perturbation, and fixed shuffling. In various embodiments, following packetization, the three methods of fixed padding, fixed perturbation, and fixed shuffling are applied in various combinations, and optionally, iterative application of two or more rounds of any of the three methods. In various embodiments, the trailing zeroes shown for purposes of illustration in FIG. 2 as appended to the original data (606) to yield the unshuffled packetized data (608) with uniform packet size are instead a randomly generated sequence, and the beginning or totality of this randomly generated sequence is stored in encrypted form along with the encrypted shuffled indices to facilitate later separation of original data from the appended random sequence by establishing an end-of-file (EOF) sequence. In further embodiments, the statistical distribution of randomly generated values that are appended to the original data (606) to create uniform packet size may be constrained by considerations such as the statistical distribution of values in the parent dataset.

Figure 3:
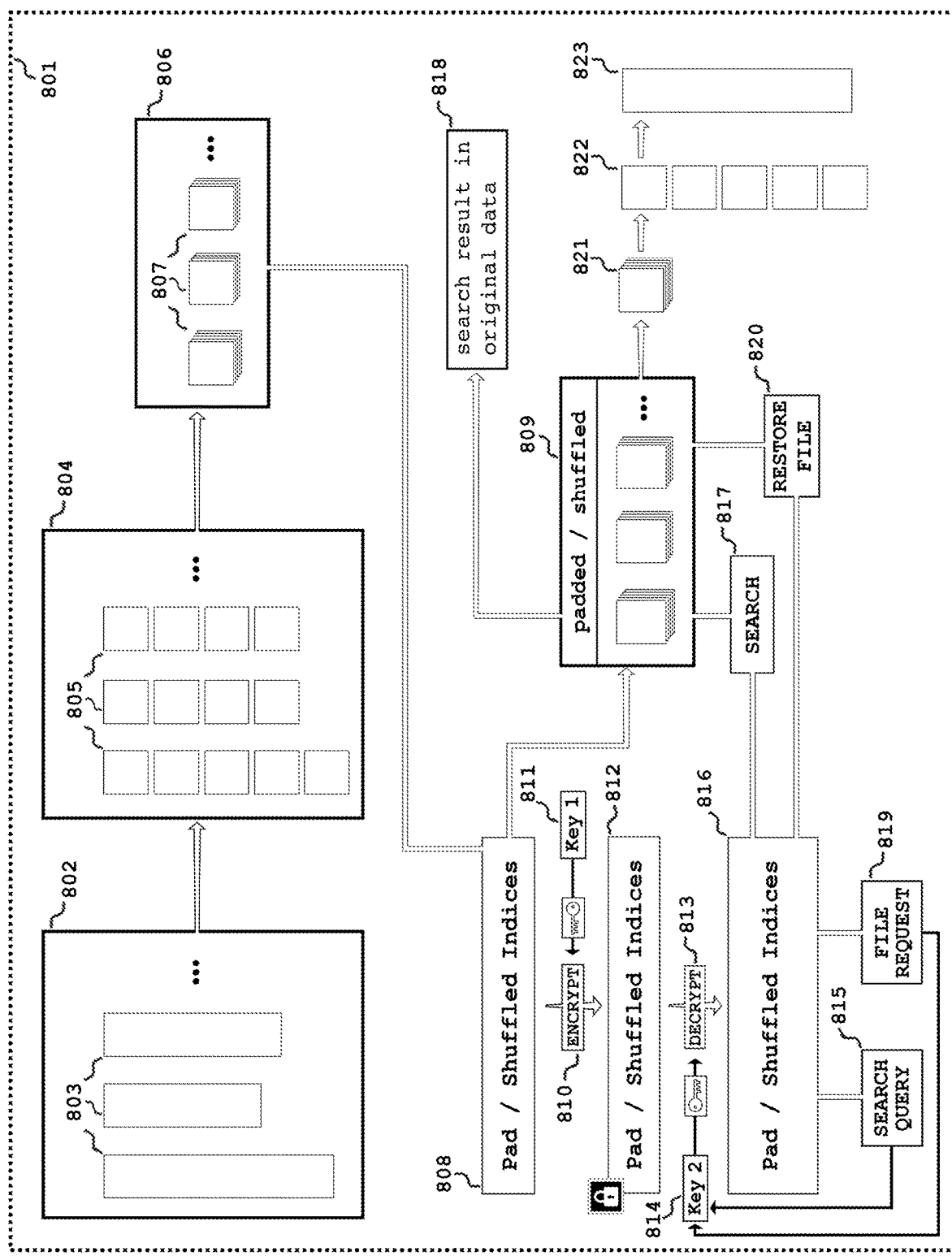
FIG. 3 illustrates a system wherein files on a computer system or cloud service may be stored securely in a format that allows for search and file restoration by credentialed users.

FIG. 3 illustrates systems wherein files on a computer system or cloud service may be stored securely in a format that allows for search and file restoration by credentialed users. The system components include memory and processors that are networked which are programmed, for example and without limitation, to perform the following programmatic search methods illustrated in FIG. 3 are generally similar to the programmatic search methods described and shown with reference to FIG. 2. Elements of FIG. 3 having the same name as elements of FIG. 2 are generally the same, except where explicitly stated.

On a computer system or cloud service (801), an unencrypted memory storage (802) contains any number of files (803) stored in memory in conventional unencrypted form. As depicted for purposes of graphical illustration by the height of the rectangles representing individual data files (803), the unencrypted files may be of arbitrary size. An initial transformation step is performed on the files (803) in memory storage (802) to subdivide a copy of the files (803) into packetized form (805) in memory storage (804), with packets of uniform size as illustrated graphically (805). The uniform file packets (805) in memory storage (804) are then transformed into data arrays (807) with the shape determined by ([packet size]×[number of packets]) in memory storage (806). In a preferred embodiment, fixed padding data and fixed shuffle indices (808) are generated that correspond to the data shape of the arrays (807), in the fashion described in detail above, and stored temporarily for use in transforming the data arrays (807) in memory storage (806) into fixed padded and fixed shuffled data arrays (809). In addition, the fixed padding and fixed shuffling indices (808) are encrypted (810) using a first key of a key pair, Key 1 (811) to yield encrypted fixed padding and fixed shuffling indices (812). After generation of the encrypted fixed padding and fixed shuffling indices (812), the original fixed padding and fixed shuffling indices (808) are deleted from memory.

When a search query (815) is produced by a credentialed user, a second key of a key pair, Key 2 (814) is used to decrypt (813) the encrypted fixed padding and fixed shuffling indices (812) to yield a decrypted version of the fixed padding and fixed shuffling indices (816). The fixed padding and fixed shuffling indices (816) are then applied to the search query and the result is used to perform a search (817) on the fixed padded and fixed shuffled data arrays (809) to yield a search result in the original data (818) using the method described in detail above. After the search is performed, the decrypted fixed padding and fixed shuffling indices (816) are deleted from memory.

When a file request (819) is produced by a credentialed user, a second key of a key pair, Key 2 (814) is used to decrypt (813) the encrypted fixed padding and fixed shuffling indices (812) to yield a decrypted version of the fixed padding and fixed shuffling indices (816). The file request (819) is then addressed using the decrypted fixed padding and fixed shuffling indices (816) to restore the requested file (820) from the fixed padded and fixed shuffled data arrays (809), to yield an unpadded and unshuffled data array for the requested file (821). The unpadded and unshuffled data array for the requested file (821) is then transformed into the corresponding data packets of fixed size (822), which are then rejoined to yield the original file (823). After restoration of the original file (823), the decrypted fixed padding and fixed shuffling indices (816) are deleted from memory. In alternative embodiments for implementation of secure search and file restoration, fixed perturbation is performed between the fixed padding and fixed shuffling, as described in detail above.

Figure 4:
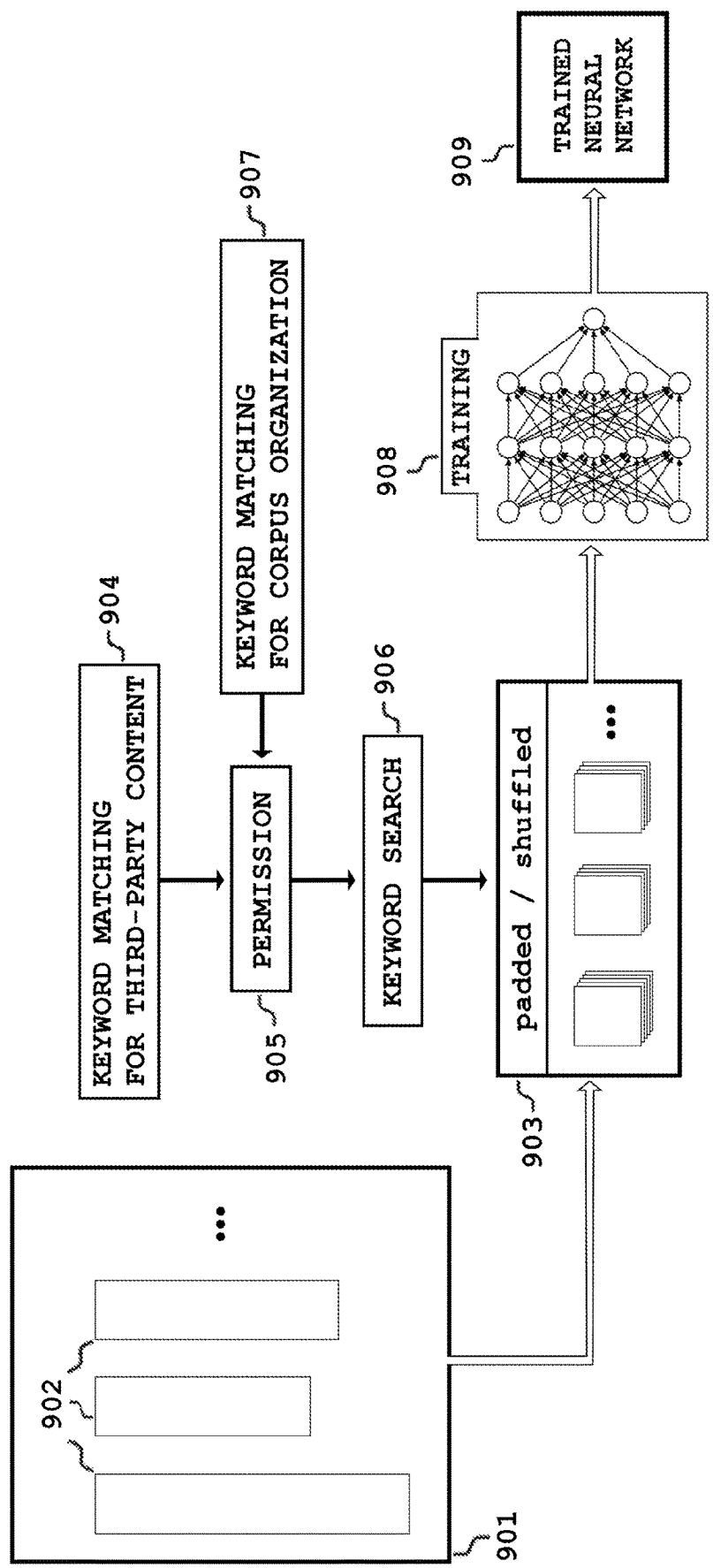

FIG. 4 illustrates systems wherein files, messages, posts, notes, or other electronic communications on a mobile, online, Web-based, or cloud-based electronic communication system or computer system or cloud service may be stored securely in a format that allows for keyword matching search and secure neural network training by permissioned entities. The components of FIG. 4 include memory and processors that are networked which are programmed, for example and without limitation, to functions described herein. It will be apparent to those skilled in the art that the disclosed invention to secure data in searchable form and the disclosed invention to secure data for training neural networks, alone or in combination, yield certain advantageous embodiments of potential commercial interest. In one such embodiment, a mobile, online, Web-based, or cloud-based electronic communication system or other storage medium (901) contains a corpus of any number of data files, messages, posts, notes, or other electronic communications (902), and these are converted according to the methods disclosed above into a fixed padded and fixed shuffled corpus (903). Where it is desirable to obtain keyword matching for third-party content (including, but not limited to, advertising content), permissions (905) are obtained, and keyword search (906) is performed according to the methods disclosed above. The use of the term 'keyword' as used here includes any search for a content match of interest in the secured data contained in the fixed padded and fixed shuffled corpus (903), including any data pattern of interest in data type stored therein, including binary or machine representations, text, images, video, or other forms of matchable digital content. In similar fashion, keyword matching may be performed for other purposes, including, but not limited to, content organization within the corpus of information (907). Because the fixed padded and fixed shuffled corpus of information (903) is organized into data arrays of fixed shape, as disclosed above, the fixed-shape packets of fixed padded and fixed shuffled data (903) may be used to train a neural network (908) to yield a trained neural network (909). In certain embodiments, the neural network (908) implemented in this context represents unsupervised machine learning to organize the data contained in the fixed padded and fixed shuffled corpus of information (903). In other embodiments, the neural network (908) implemented in this context represents supervised machine learning using labels obtained from metadata, user-provided data, the results of programmatic keyword matching (904, 907), or other data sources of interest. In other embodiments, the neural network (908) implemented in this context represents other types of machine learning approaches known in the art, including but not limited to semi supervised learning, dimensionality reduction, anomaly detection, or reinforcement learning. As described above for the other machine learning processes disclosed in the present invention, the neural network (908) implemented in this context may be, in alternative embodiments, another form of machine learning algorithms outside the domain of ANNs, including, but not limited to, algorithms supporting supervised machine learning, unsupervised machine learning, and reinforcement machine learning, such as linear regression, polynomial regression, logistic regression, support vector machines, naive Bayes, decision trees, random forests, k-Nearest Neighbors, and ensemble learning approaches.

The present invention is not intended to be limited to a system or method which must satisfy one or more of any stated or implied objects or features of the invention. Modifications and substitutions by one of ordinary skill in the art are considered to be within the scope of the present invention. Numerous details are provided to convey an understanding of the embodiments described herein. It will be understood by those of ordinary skill in the art that the embodiments described herein may be practiced without these specific details. In other instances, well-known methods, procedures, and components have not been described in detail so as not to obscure the embodiments described herein. The present invention is not limited to the preferred, exemplary, or primary embodiment or embodiments described herein.

In addition, while the invention has been described in terms of a number of different functions or steps, it will be appreciated by those skilled in the art that the order of the functions or steps may be performed in a different order than as described herein, and that certain functions or steps may be combined into to a fewer number or greater number of steps to achieve the same effect as is described herein.

It will also be understood by one of ordinary skill in the art that the systems and methods may be provided on many different types of computer-readable media including computer storage mechanisms that contain instructions for use in execution by a processor to perform the methods' operations and implement the systems described herein. Any unit, component, computer, module, server, terminal, or device described or exemplified herein that executes instructions may include or otherwise have access to computer readable media such as storage media, computer storage media, or data storage devices (removable and/or non-removable, volatile and/or non-volatile) such as, for example, CD-ROM, diskette, RAM, ROM, EEPROM, flash memory, computer hard drive, magnetic disks, optical disks, tape, or other memory technology implemented in any method for storage or transmission of information, such as computer readable instructions, data structures, program modules, or other data. Any such computer storage media may be part of the device or accessible or connectable thereto. Any application or module herein described may be implemented using computer readable and/or executable instructions that may be stored or otherwise held by such computer-readable media.

With respect to the appended claims, unless stated otherwise, the term "first" does not, by itself, require that there also be a "second." Moreover, reference to only "a first" and "a second" does not exclude additional items. While the particular computer-based systems and methods described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one," unless otherwise so recited in the claim.

Although the invention has been described relative to specific embodiments thereof, there are numerous variations and modifications that will be readily apparent to those skilled in the art in light of the teachings presented herein.

The appended drawings are diagrammatic, showing features of the invention and their relation to other features and structures, and are not made to scale.

The invention claimed is:

1. A method comprising:
   storing a modified information including
      accepting information, where the information is a sequence of values,
      forming the sequence of values into a plurality of packets of uniform size, and
      forming the modified information by applying an algorithm to the plurality of packets of uniform size; and
   searching the modified information including
      accepting a search sequence from a user, where the search sequence is a sequence of two or more search values,
      searching within the modified information for an occurrence of each of the two or more search values,
      using an inverse of the algorithm as a lookup table to determine a presence and a location of the search sequence within the information, and
      when the search sequence occurs sequentially in the information, providing the presence and the location of the search sequence in the information to the user.

2. The method of claim 1, wherein said method includes encrypting the algorithm to form an encrypted algorithm, and wherein said using the algorithm includes decrypting the algorithm.

3. The method of claim 1, wherein said information is one or more data files, wherein said storing modified information includes storing one or more modified data files, and wherein said method further comprises:
   accepting a request for a data file from the user,
   using the inverse of the algorithm as a lookup table to recover the requested data file from the one or more modified data files, and
   providing the requested one or more data files to the user.

4. The method of claim 3, wherein said method includes encrypting the algorithm to form an encrypted algorithm, and where using the algorithm includes decrypting the algorithm.

5. The method of claim 1,
wherein said algorithm includes a pad of values, and
wherein said modifying information includes appending the pad of values to each packet.

6. The method of claim 1,
wherein said algorithm includes a plurality of perturbation functions,
wherein each perturbation function of the plurality of perturbation functions corresponds to a position in each packet, and
wherein said modifying information includes applying each perturbation function to the value in the corresponding position in each packet.

7. The method of claim 1,
wherein said algorithm includes an index shuffling, and
wherein said modifying information includes applying the index shuffling to each packet.

8. The method of claim 1, wherein said algorithm is a mathematical equivalent to two or more modifications performed sequentially, where the two or more modifications include two or more of:
a) one or more paddings each including a pad of values, wherein said modifying information includes appending the pad of values to each packet or previously modified packet;
b) one or more perturbations each including an array of perturbation functions, where each perturbation function corresponds to a position in each packet, wherein said modifying applies each perturbation function to the value in the corresponding position in each packet or previously modified packet; and
c) one or more index shuffles each including an index shuffling for each index shuffle, wherein said modifying information includes applying the index shuffling to each packet or modified packet.

9. A system including networked memory and processors programmed to:
store a modified information including
accept information, wherein the information is a sequence of values,
form the sequence of values into a plurality of packets of uniform size;
form the modified information by applying an algorithm to the plurality of packets of uniform size;
search the modified information including
accept a search sequence from a user, wherein the search sequence is a sequence of two or more search values;
search within the modified information for an occurrence of each of the two or more search values,
use an inverse of the algorithm as a lookup table to determine a presence and a location of the search sequence in the information, and
when the search sequence occurs sequentially in the information, provide the presence and the location of the search sequence in the information to the user.

10. The system of claim 9, wherein said processors are further programmed to encrypt the algorithm to form an encrypted algorithm, and wherein said use the algorithm includes said processors further programmed to decrypt the algorithm.

11. The system of claim 9, wherein said information is one or more data files, wherein said store modified information includes store one or more modified data files, and wherein said processors are further programmed to:
accept a request for a data file from the user,
use the inverse of the algorithm as a lookup table to recover the requested data file from the one or more modified data files, and
provide the requested one or more data files to the user.

12. The system of claim 11, wherein said processors are further programmed to encrypt the algorithm to form an encrypted algorithm, and wherein said use the algorithm includes said processors further programmed to decrypt the algorithm.

13. The system of claim 9, wherein said algorithm is a mathematical equivalent of one or more modifications performed sequentially, where said one or more modifications includes one or more of:
a) one or more paddings each including a pad of values, wherein said modify information includes said processor further programmed to append the pad of values to each packet or previously modified packet;
b) one or more perturbations each including an array of perturbation functions, where each perturbation function corresponds to a position in each packet, wherein said modify information includes said processor further programmed to apply each perturbation function to the value in the corresponding position in each packet or previously modified packet; and
c) one or more index shuffles each including an index shuffle, wherein said modify information includes said processor further programmed to apply the index shuffling to each packet or modified packet.

* * * * *